(No Model.)
H. N. FRENTRESS.
FREIGHT CAR DOOR.
No. 288,565. Patented Nov. 13, 1883.
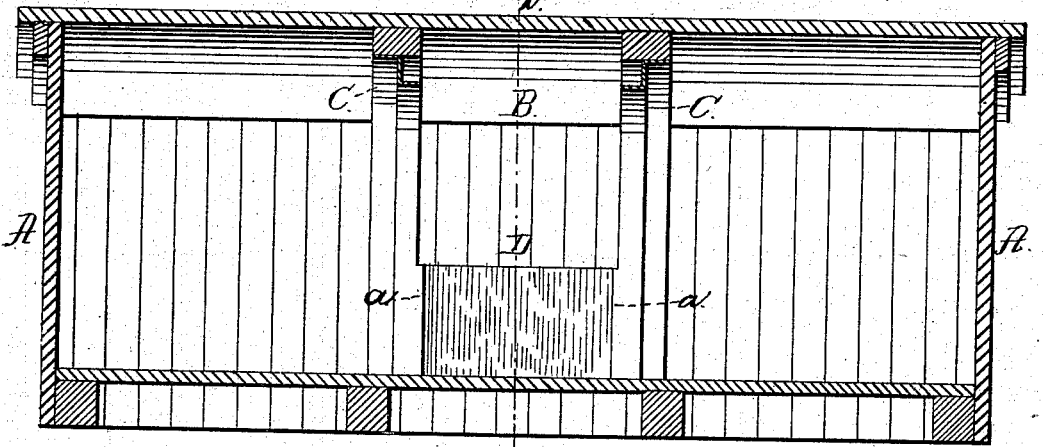
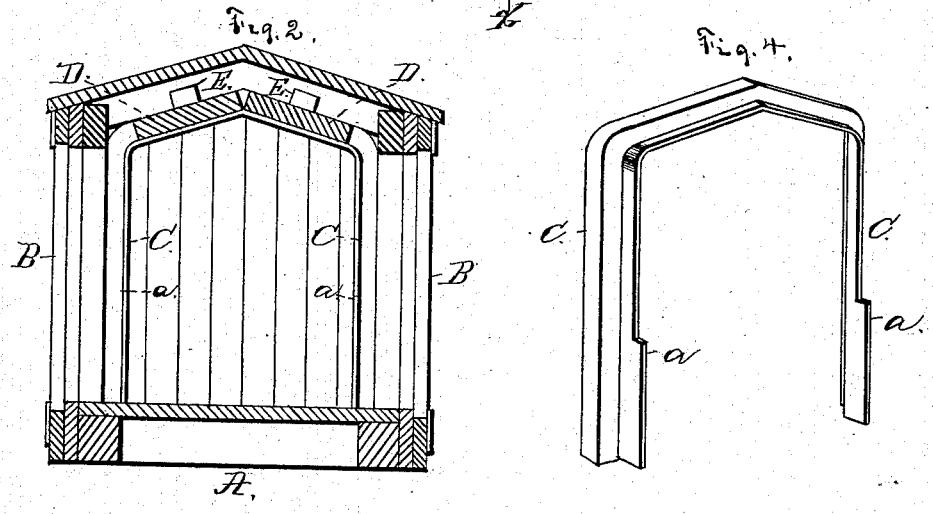
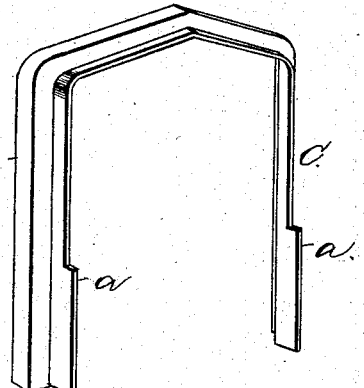
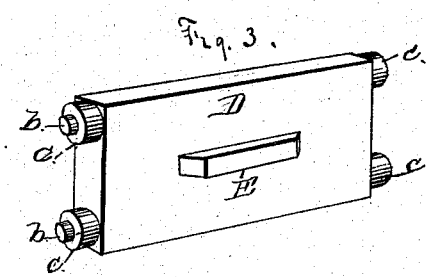
Attest
W. A. Clark,
Jno. C. Schroeder
Inventor,
Henry N. Frentress
by Geo. W. Dyer.
Att'y

UNITED STATES PATENT OFFICE.

HENRY N. FRENTRESS, OF EAST DUBUQUE, ILLINOIS, ASSIGNOR OF TWO-THIRDS TO CHARLES W. WARE, OF SAME PLACE.

FREIGHT-CAR DOOR.

SPECIFICATION forming part of Letters Patent No. 288,565, dated November 13, 1883.

Application filed June 9, 1883. (No model.)

*To all whom it may concern:*

Be it known that I, HENRY N. FRENTRESS, of East Dubuque, in the county of Jo Daviess and State of Illinois, have invented a new and useful Improvement in Freight-Car Doors; and I do hereby declare that the following is a full and exact description of the same, reference being had to the accompanying drawings, and to the letters of reference marked thereon.

The invention involved in the subject-matter of this application relates to an improvement in doors for freight-cars, and particularly to that class of cars employed in the transportation of grain and the like.

The object of the improvement is to enable the doors to be elevated to a position which will place them out of the way when it is desired to load or unload the car; and it therein consists in the construction and arrangement of a track, and of doors engaging with and traveling on said track, all as more fully hereinafter described, and pointed out in the claims.

For the better understanding of the invention and to enable those skilled in its relative art to know how to make and use the same, reference may be had to the accompanying drawings, in which—

Figure 1 is a central longitudinal section of the body of a car; Fig. 2, a transverse section on the line $x$ $x$ of Fig. 1, and showing the doors in a position under the roof of the car; Fig. 3, a detail view of one of the doors, and Fig. 4 a similar view of one rail of the track.

Like letters of reference denote corresponding parts in each figure of the drawings.

A represents the body of a car, provided on each side with the usual external door, B.

Upon the interior of the car, and on each side of each doorway, is secured a metallic strip, $c$, which extends from the flooring of the car up and across under the roof of the same. These two strips constitute the track referred to, and for convenience and economy in manufacturing they are each made of a single piece of metal, and are bent twice at a right angle longitudinally in opposite directions, for the purpose of forming two flanges, one of which flanges constitutes the track proper, and the other means enabling said track to be secured to the sides and roof of the car by means of bolts or other suitable devices. The lower portion of each strip $c$ is widened, as indicated at $a$, for the purpose of covering the space occurring between the two end bearings of each inner door when the same is in its normal position.

D D represent the inner doors, or those which travel on the track formed by the described arrangement of the metallic strips C C. Each of the said doors D is solid and provided near each corner with a bearing, $b$, by means of which arrangement there is instituted between the two end bearings of each door a space which permits the doors to readily pass the curve occurring in the track at the point of connection between the roof and sides of the car.

For the purpose of avoiding rapid wearing of the bearings $b$ and to enable each door to be elevated and lowered with ease, I provide each of said bearings with a friction-roller, $c$, which rollers accomplish these objects and take up all friction incident with the operation of the doors. These rollers are mounted upon the doors near their corner-bearings for the purpose of leaving a space sufficient to prevent the said rollers from coming into contact with the floor of the car when the doors fall to their normal position, as otherwise the rollers or their bearings would surely break by the sudden fall of the doors.

Each of the doors D may be provided on its outer face with a strip, E, or other suitable means for elevating and lowering the same.

It may be found desirable to modify the construction of the strips C C, and also to correspondingly change the construction of the doors D D, but that herein related will be found the most feasible and effective in use.

Having thus described my invention, what I claim, and desire to secure by Letters Patent, is—

1. In a freight-car door, a track for accommodating the vertically-sliding doors thereof, consisting of two strips of metal, each made of a single piece bent twice at a right angle longitudinally in opposite directions to form two flanges, one of which constitutes the track proper, and the other means enabling said track to be secured to the sides and roof of the car, substantially as described and shown.

2. In the device as described, the combination, with the track C C and the vertically-sliding doors D D, of the friction-rollers c, mounted upon said doors near their corner-bearings, substantially as and for the purpose to set forth.

In testimony whereof I affix my signature in presence of two witnesses.

HENRY N. FRENTRESS.

Witnesses:
WILLIAM GRAHAM,
MONROE M. CADY.